Oct. 6, 1936.  M. WEINBERG  2,056,549
SPEED CONTROL DEVICE
Filed Aug. 25, 1934
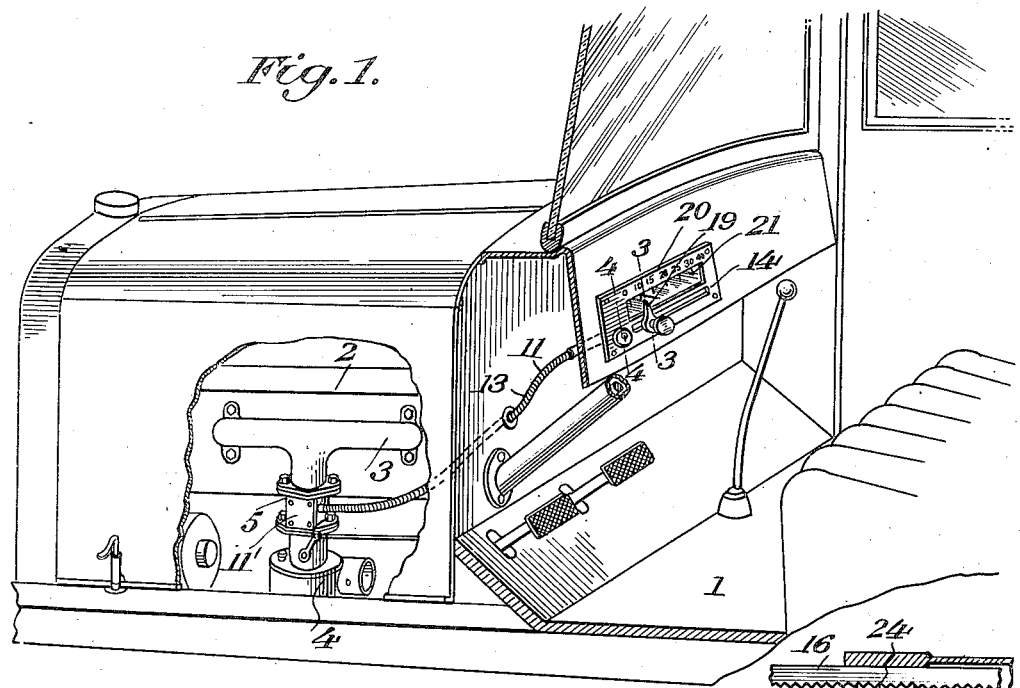
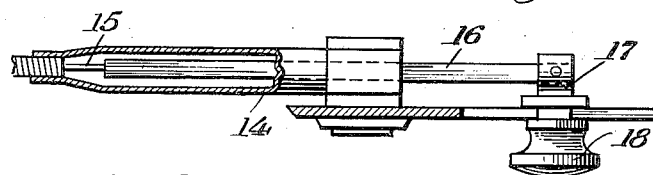
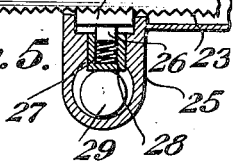
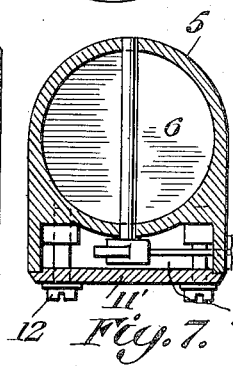
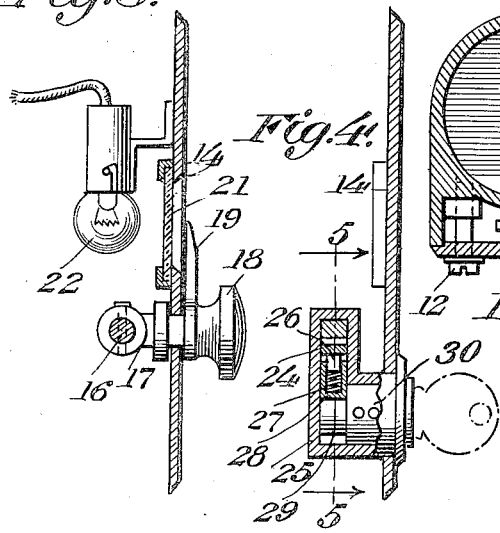
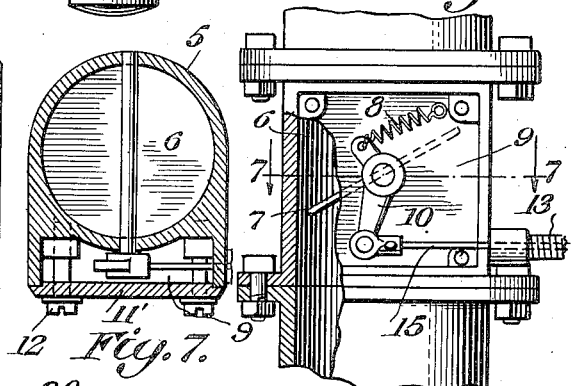
Morris Weinberg
INVENTOR
BY Victor J. Evans & Co.
ATTORNEYS Patented Oct. 6, 1936

2,056,549

UNITED STATES PATENT OFFICE 2,056,549

SPEED CONTROL DEVICE

Morris Weinberg, New York, N. Y., assignor of one-half to Sidney Cohen, New York, N. Y.

Application August 25, 1934, Serial No. 741,529

1 Claim. (Cl. 116—124)

This invention relates to speed control devices for motor vehicles and has for the primary object the provision of a device of this character which may be readily installed on an engine of a motor vehicle with its operating mechanism suitably located at some advantageous place in the motor vehicle, whereby the device may be adjusted and locked so as to prevent the driver or operator of the motor vehicle from driving said vehicle at a speed greater than the speed selected or set by the device.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a fragmentary perspective view, partly in section, showing a speed control device applied to a motor vehicle and constructed in accordance with my invention.

Figure 2 is a fragmentary sectional view showing a part of the operating mechanism of the control device.

Figure 3 is a sectional view taken on the line 3—3 of Figure 1.

Figure 4 is a sectional view taken on the line 4—4 of Figure 1.

Figure 5 is a sectional view taken on the line 5—5 of Figure 4.

Figure 6 is a fragmentary vertical sectional view showing the speed regulating valve located between the carburetor and the intake manifold of the engine.

Figure 7 is a sectional view taken on the line 7—7 of Figure 6.

Referring in detail to the drawing, the numeral 1 indicates a fragmentary portion of a motor vehicle wherein the engine is indicated by the character 2 and provided with the usual intake manifold 3 and carburetor 4. To adapt my invention to a motor vehicle, a fitting 5 is provided which is placed between the manifold 3 and the carburetor 4 and this fitting has a passage 6 therethrough controlled by a valve 7 normally urged into a closed position by a spring 8. The stem of the valve extends into a chamber 9 of the fitting and is provided with an arm 10 to which the operating mechanism 11 is connected. The chamber 9 is closed by a plate 11' which through suitable fasteners 12 may be secured in chamber closing position.

The operating mechanism 11 consists of a flexible tube 13 extending from the fitting 5 to a housing 14 mounted at any suitable place within the automobile, for instance, to the instrument board, as shown in Figure 1. Slidably mounted in the flexible tube 13 is a flexible element 15, one end of which is pivotally connected to the arm 10 and the other end is connected to a bar 16 slidably mounted in the housing and has connected thereto the shank 17 of a finger piece 18. The finger piece is arranged exteriorly of the housing 14 and carries a pointer 19 operating over a scale plate 20 provided on the housing. The housing is provided with a slot for the reception of the shank 17 of the finger piece and also is equipped with a window 21 positioned in rear of the pointer 19 for the purpose of permitting light rays from an electric lamp 22 arranged in the housing to illuminate the pointer and the scale plate. The electric lamp may be furnished with electricity from any suitable means or connected into the lighting circuit of the motor vehicle.

The bar 16 has a series of V-shaped ratchet teeth 23 engaged with the V-shaped teeth of a lock member 24 mounted in a lock casing 25 carried by the housing 14. The bar 16 has its teeth at all times engaged by those of the lock member 24, but when the latter is in released position, as will presently be described, the bar 16 may ratchet over the said lock member, when moved longitudinally. A portion of the lock element 24 is in the form of a plunger 26 operating against a spring 27 of the coil type seated in a sleeve-like element 28. The element 28 has a limited sliding movement in the lock casing and rides upon a cam or eccentric 29 forming part of a lock mechanism 30. The spring 27 constantly urges the toothed member 24 into engagement with the teeth of the bar 16 and thereby holds said bar from free or accidental longitudinal movement. The spring 27 is sufficiently weak as to permit the bar 16 ratcheting over the member 24 when the said bar is actuated by the finger piece 18. When the barrel of the lock 30 is turned by the key, the cam 29 will be brought to raise the sleeve 28, to cause the spring to force the member 24 into tight engagement with the teeth of the bar 16 and incident to the compression thus exerted on the spring to cause the member 24 to lock the bar 16 thereto. Thus the owner of the vehicle desiring that the latter not be driven beyond approximate selected speed, the finger piece is adjusted to the speed desired and the bar is then locked in the adjusted position which places or positions the valve 7 so as to admit only such amount of fuel to the engine that will prevent the driving of the vehicle beyond a selected speed. Any speeds below the maximum or selected speed of operation of the vehicle are controlled through the usual control valve of the carbureter.

Having described the invention, I claim:

A device of the character set forth comprising a housing having a window and a slot and a scale denoting miles per hour, said scale being located adjacent one side of the window and the slot being located adjacent the opposite side of the window, a shank extending through the slot, a combined finger piece and indicator secured to the shank and movable over the window and relative to the scale, a rack bar guided for longitudinal movement in the housing and connected to the shank of the finger piece, means for locking the rack bar from movement comprising a plunger, a toothed member on the plunger which is at all times in engagement with the teeth of the rack bar, a slidable sleeve in which the plunger is received, a weak coiled expansion spring in the sleeve urging the toothed member against the rack bar but permitting the ratcheting of the rack bar over said toothed member when the bar is moved by the finger piece, and a key actuated rotary cam on which the sleeve rests and which sleeve is moved by the cam, when the latter is turned to one position to compress the spring between the sleeve and said toothed member to lock said member to the rack bar.

MORRIS WEINBERG.